(12) United States Patent
Yamashita

(10) Patent No.: US 10,919,564 B2
(45) Date of Patent: Feb. 16, 2021

(54) MOTOR CONTROL DEVICE, MOTOR, AND ELECTRIC POWER STEERING DEVICE

(71) Applicant: Nidec Corporation, Kyoto (JP)

(72) Inventor: Yoshiaki Yamashita, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 141 days.

(21) Appl. No.: 16/337,417

(22) PCT Filed: Sep. 22, 2017

(86) PCT No.: PCT/JP2017/034192
§ 371 (c)(1),
(2) Date: Mar. 28, 2019

(87) PCT Pub. No.: WO2018/062004
PCT Pub. Date: Apr. 5, 2018

(65) Prior Publication Data
US 2019/0232999 A1    Aug. 1, 2019

(30) Foreign Application Priority Data

Sep. 30, 2016 (JP) ................................. 2016-193881

(51) Int. Cl.
*B62D 5/04* (2006.01)
*H02K 11/33* (2016.01)
(Continued)

(52) U.S. Cl.
CPC .......... *B62D 5/0406* (2013.01); *B62D 5/064* (2013.01); *H02K 5/04* (2013.01); *H02K 5/22* (2013.01); *H02K 11/33* (2016.01)

(58) Field of Classification Search
CPC .. H02K 5/00; H02K 5/04; H02K 5/22; H02K 11/00; H02K 11/21; H02K 11/33;
(Continued)

(56) References Cited

U.S. PATENT DOCUMENTS

| | | | |
|---|---|---|---|
| 6,081,056 A  * | 6/2000 | Takagi | H02K 5/08 310/216.137 |
| 2003/0200761 A1* | 10/2003 | Funahashi | F04B 35/04 62/228.4 |

(Continued)

FOREIGN PATENT DOCUMENTS

| | | |
|---|---|---|
| JP | 60-141147 A | 7/1985 |
| JP | 2007-306671 A | 11/2007 |

(Continued)

OTHER PUBLICATIONS

Official Communication issued in International Patent Application No. PCT/JP2017/034192, dated Dec. 12, 2017.

*Primary Examiner* — Tran N Nguyen
(74) *Attorney, Agent, or Firm* — Keating & Bennett

(57) ABSTRACT

A motor control device includes a frame including a metal material, a substrate disposed on an upper side of the frame with a gap between the substrate and the upper side of the frame member, the substrate including a hole penetrating an upper surface and a lower surface, a wiring that is inserted into the hole from a side of the upper surface of the substrate, and a tip portion connected to the substrate, and an insulating spacer interposed between the frame and the substrate. The spacer includes a side wall portion that surrounds the tip portion of the wiring in a plan view.

13 Claims, 5 Drawing Sheets

(51) Int. Cl.
*B62D 5/06* (2006.01)
*H02K 5/04* (2006.01)
*H02K 5/22* (2006.01)

(58) Field of Classification Search
CPC .......... B62D 5/00; B62D 5/04; B62D 5/0406;
B62D 5/06; B62D 5/064; B62D 5/065
See application file for complete search history.

(56) References Cited

U.S. PATENT DOCUMENTS

| | | | |
|---|---|---|---|
| 2006/0138886 A1* | 6/2006 | Ito | H02K 3/522 |
| | | | 310/89 |
| 2008/0278918 A1* | 11/2008 | Tominaga | H05K 7/2049 |
| | | | 361/719 |
| 2015/0222156 A1 | 8/2015 | Tomizawa et al. | |
| 2016/0204670 A1 | 7/2016 | Yamasaki | |

FOREIGN PATENT DOCUMENTS

| | | |
|---|---|---|
| JP | 2010-62467 A | 3/2010 |
| JP | 2016-25814 A | 2/2016 |

\* cited by examiner

MOTOR CONTROL DEVICE, MOTOR, AND ELECTRIC POWER STEERING DEVICE

BACKGROUND OF THE INVENTION

1. Field of the Invention

The present disclosure relates to a motor control device, a motor, and an electric power steering device.

2. Description of the Related Art

In a motor equipped with a control device, a structure is known in which a tip portion (connector terminal) of a wiring for supplying electric power and a signal is connected by press fitting.

There is a problem that the dimension of the motor increases.

SUMMARY OF THE INVENTION

A motor control device of a motor according to an example embodiment of the present invention includes a frame including a metal material, a substrate disposed on an upper side of the frame with a gap between the substrate and the upper side of the frame, the substrate including a hole penetrating an upper surface and a lower surface, a wiring that is inserted into the hole from a side of the upper surface of the substrate, and a tip portion connected to the substrate, and an insulating spacer interposed between the frame and the substrate. The spacer includes a side wall portion that surrounds the tip portion of the wiring in a plan view.

The above and other elements, features, steps, characteristics and advantages of the present disclosure will become more apparent from the following detailed description of the preferred embodiments with reference to the attached drawings.

DETAILED DESCRIPTION OF THE PREFERRED EMBODIMENTS

Hereinafter, a motor according to an embodiment of the present invention will be described with reference to the drawings. Note that the scope of the present invention is not limited to the embodiment described below, but may be arbitrarily changed within the technical spirit of the present invention. Also note that scales, numbers, and the like of the structures illustrated in the following drawings may differ from those of actual structures, for the sake of easier understanding of the configurations.

In the accompanying drawings, an xyz coordinate system is shown appropriately as a three-dimensional orthogonal coordinate system. In the xyz coordinate system, a z-axis direction is assumed to be a direction parallel to the axial direction of a center axis J shown in FIG. 1. An x-axis direction is assumed to be a direction orthogonal to the z-axis direction, and is assumed to be a lateral direction in FIG. 1. A y-axis direction is assumed to be a direction orthogonal to both the x-axis direction and the z-axis direction.

In the following description, the positive side (+z side, one side) in the z-axis direction is referred to as an "upper side", and the negative side (−z side, the other side) in the z-axis direction is referred to as a "lower side". It should be noted, however, that the above definitions of the upper side and the lower side are made simply for the sake of description, and are not meant to restrict actual relative positions or directions. Also, unless otherwise explained, a direction (z-axis direction) parallel to the center axis J is simply referred to as an "axial direction", a radial direction having its center on the center axis J is simply referred to as a "radial direction", and a circumferential direction having its center on the center axis J, that is, a direction around the center axis J, is simply referred to as a "circumferential direction". In addition, in the present description, the plan view refers to the case of seeing along the z-axis direction.

Figure 1:
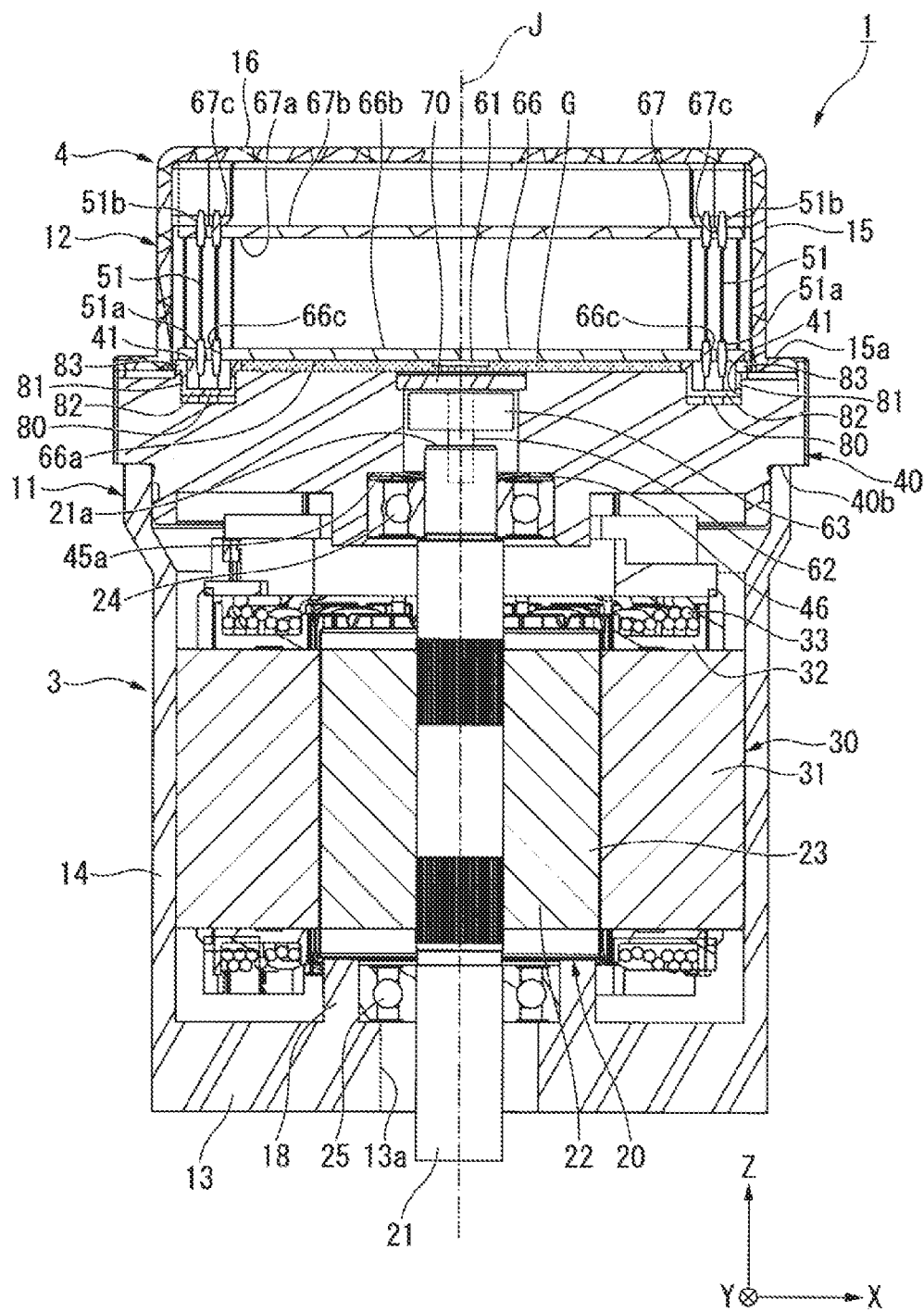
FIG. 1 is a cross-sectional view showing a motor including a motor control device according to an example embodiment of the present disclosure.
Figure 2:
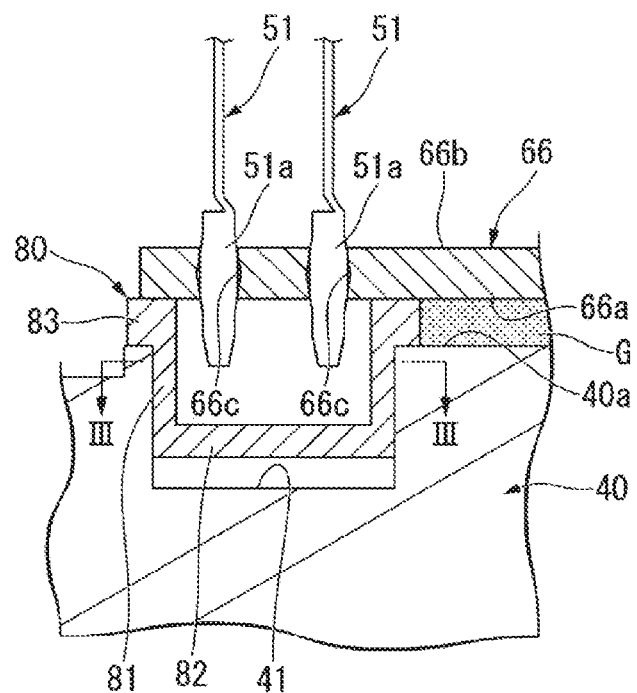
FIG. 2 is an enlarged cross-sectional view in which a portion of FIG. 1 is enlarged.
Figure 3:
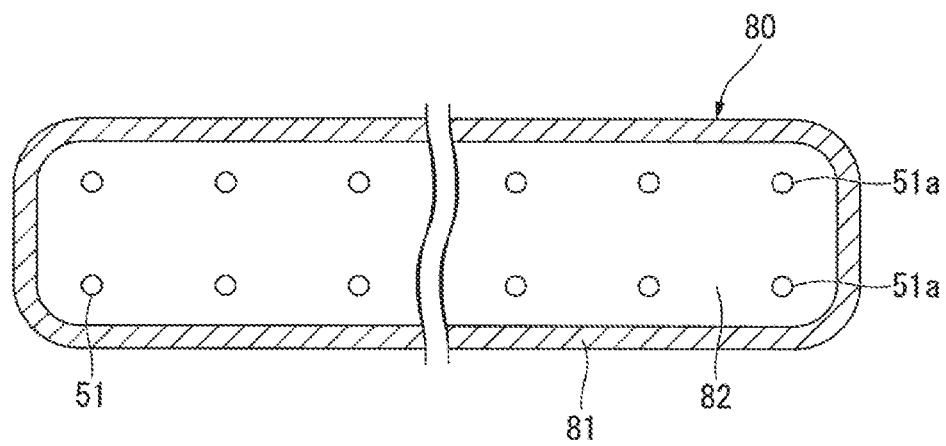
FIG. 3 is a cross-sectional view taken along line III-III of FIG. 2.

FIG. 1 is a cross-sectional view showing a motor 1 according to the present embodiment. FIG. 2 is an enlarged cross-sectional view in which a part (the vicinity of a spacer 80) of FIG. 1 is enlarged. Further, FIG. 3 is a cross-sectional view taken along line of FIG. 2.

The motor 1 includes a main body unit 3, and a motor control device (hereinafter simply referred to as a control device) 4. The main body unit 3 mainly constitutes a drive unit of the motor 1. The control device 4 controls the main body unit 3. The control device 4 is positioned on the upper side of the main body unit 3. The main body unit 3 includes a motor housing 11, a rotor 20 having a shaft 21, a stator 30, an upper-side bearing (bearing) 24, a lower-side bearing 25, and a sensor magnet 63. The control device 4 includes a substrate housing 12, a bearing holder (frame member) 40, a lid 70, the spacer 80, a first substrate 66, a second substrate 67, a plurality of connection pins (wirings) 51, and heat dissipation grease (heat dissipation material) G.

The motor housing 11 and the substrate housing 12 accommodate respective units (mainly, the main body unit 3) of the motor 1 therein. The motor housing 11 has a tubular shape that opens to the upper side (+z side). Further, the substrate housing 12 has a tubular shape that opens to the lower side (−z side). The motor housing 11 and the substrate housing 12 are arranged with their openings facing each other. Between the motor housing 11 and the substrate housing 12, a peripheral edge portion of the bearing holder 40, described below, is interposed.

The motor housing 11 has a first tubular portion 14, a first bottom portion 13, and a lower-side bearing holding portion 18. The first tubular portion 14 has a tubular shape that surrounds the radially outer side of the stator 30. In the present embodiment, the first tubular portion 14 is in a cylindrical shape, for example. The first tubular portion 14 is fitted in a stepped portion 40b provided to the peripheral edge of the bearing holder at the upper end. To the inner side surface of the first tubular portion 14, the stator 30 is fixed.

The first bottom portion 13 is provided at an end portion on the lower side (−z side) of the first tubular portion 14. The first bottom portion 13 is provided with an output shaft hole portion 13a penetrating the first bottom portion 13 in the axial direction (z-axis direction). The lower-side bearing holding portion 18 is provided to a surface on the upper side (+z side) of the first bottom portion 13. The lower-side bearing holding portion 18 holds the lower-side bearing 25.

The substrate housing 12 is positioned on the upper side (+z side) of the motor housing 11. In the present embodiment, the substrate housing 12 accommodates the first substrate 66 and the second substrate 67. Electronic components and the like are mounted on at least one of the upper surface and the lower surface of the first substrate 66 and the second substrate 67. The substrate housing 12 has a second tubular portion 15 and a second bottom portion 16.

The second tubular portion 15 has a tubular shape that surrounds the radially outer sides of the first substrate 66 and the second substrate 67. The second tubular portion 15 is in a cylindrical shape, for example. At the lower end of the second tubular portion 15, a flange portion 15a is provided. The second tubular portion 15 is connected to an upper surface 40a of the bearing holder 40 in the flange portion 15a.

The rotor 20 has a shaft 21, a rotor core 22, and a rotor magnet 23. The shaft 21 has a columnar shape extending along the center axis J extending in the vertical direction (z-axis direction). The shaft 21 is supported by the lower-side bearing 25 and the upper-side bearing 24 so as to be rotatable about the axis of the center axis J. An end portion on the lower side (−z side) of the shaft 21 protrudes to the outside of the housing 10 via the output shaft hole portion 13a. To the end portion on the lower side of the shaft 21, a coupler (not shown) for connecting to an output target is press-fitted, for example. A hole portion is provided to an upper end surface 21a of the shaft 21. In the hole portion of the shaft 21, an attachment member 62 is fitted. The attachment member 62 is a bar-shaped member extending in the axial direction.

The rotor core 22 is fixed to the shaft 21. The rotor core 22 circumferentially surrounds the shaft 21. The rotor magnet 23 is fixed to the rotor core 22. More specifically, the rotor magnet 23 is fixed to the outer side surface along the circumferential direction of the rotor core 22. The rotor core 22 and the rotor magnet 23 rotate together with the shaft 21. It should be noted that the rotor core 22 may have a through hole or a concavity, and the rotor magnet 23 may be accommodated in the through hole or the concavity.

Figure 4:
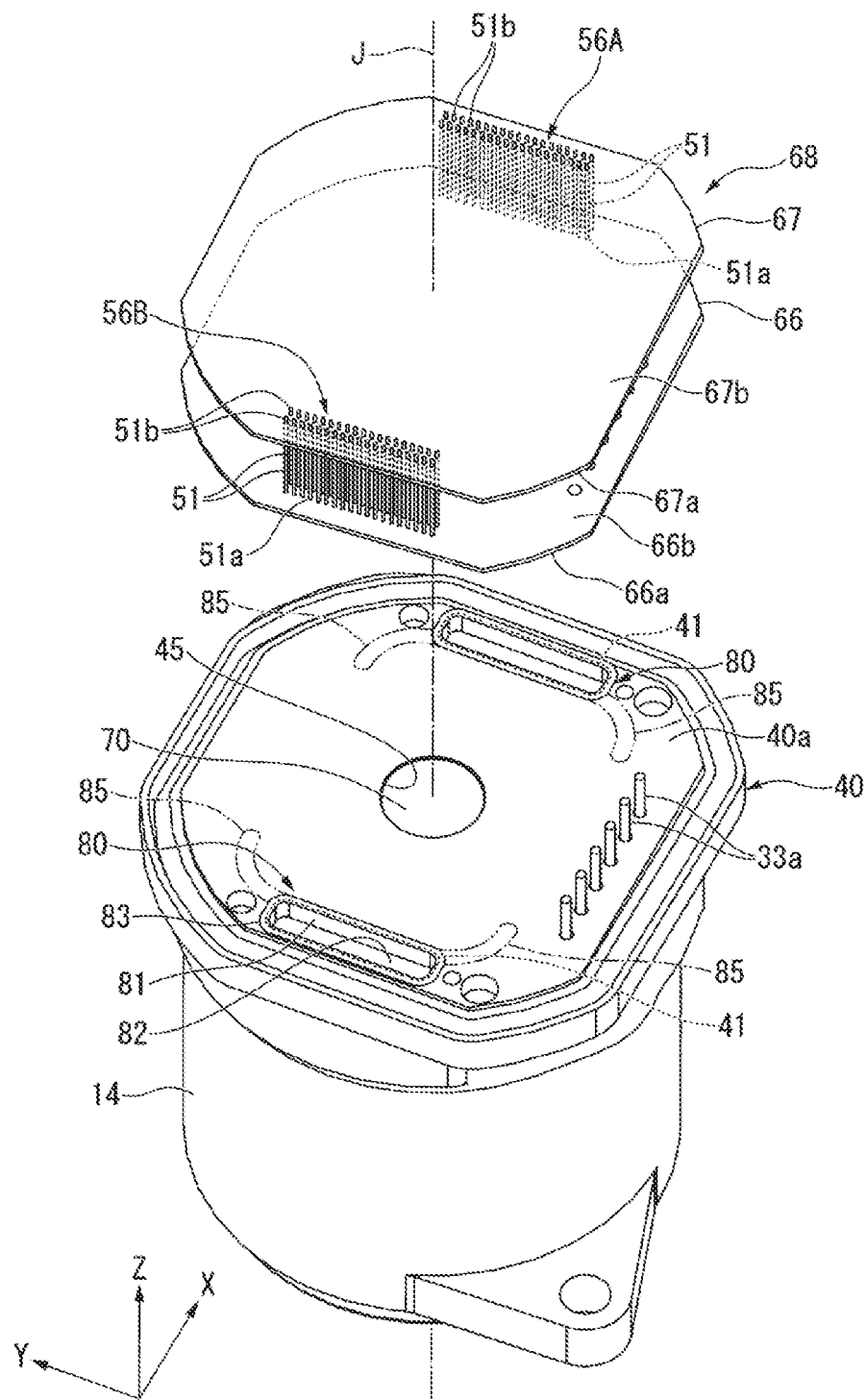
FIG. 4 is an exploded view of a motor according to an example embodiment of the present disclosure.

The stator 30 surrounds the radially outer side of the rotor 20. The stator 30 includes a stator core 31, a bobbin 32, and a coil 33. The bobbin 32 is made of a material having insulation property. The bobbin 32 covers at least a part of the stator core 31. When the motor 1 is driven, the coil 33 excites the stator core 31. The coil 33 is configured by winding a conductive wire. The coil 33 is provided to the bobbin 32. As shown in FIG. 4 to be described below, an end portion 33a of the conductive wire constituting the coil 33 extends to the upper side from the coil 33, and is connected to the first substrate 66 through the bearing holder 40.

In the present embodiment, the upper-side bearing 24 is a ball bearing. The upper-side bearing 24 rotatably supports the upper end portion of the shaft 21. The upper-side bearing 24 is positioned on the upper side (+z side) of the stator 30. The upper-side bearing 24 is held by the bearing holder 40. In the present embodiment, the lower-side bearing 25 is a ball bearing. The lower-side bearing 25 rotatably supports the lower end portion of the shaft 21. The lower-side bearing 25 is positioned on the lower side (−z side) of the stator 30.

The lower-side bearing 25 is held by the lower-side bearing holding portion 18 of the motor housing 11.

The upper-side bearing 24 and the lower-side bearing 25 support the shaft 21 of the rotor 20. The types of the upper-side bearing 24 and the lower-side bearing 25 are not particularly limited, and other kinds of bearings may be used.

The sensor magnet 63 is positioned on the upper side (+z side) with respect to the upper-side bearing 24. The sensor magnet 63 is in an annular shape. The sensor magnet 63 is fitted to the outer side surface of the attachment member 62 fixed to the shaft 21. As a result, the sensor magnet 63 is attached to the shaft 21. Further, the sensor magnet 63 is positioned above the upper-side bearing 24. That is, the sensor magnet 63 is fixed to the shaft 21 via the attachment member 62 on the upper side of the upper-side bearing 24 at the upper end portion of the shaft 21. It should be noted that the shape of the sensor magnet 63 is not limited to an annular shape, and may be another shape such as a ring shape or a disc shape. In that case, the sensor magnet 63 may be provided with a concavity, and the tip of the attachment member 62 may be fixed to the concavity by press fitting, adhesion or the like. Further, the sensor magnet 63 may be attached directly to the tip of the shaft 21.

As shown in FIG. 1, the bearing holder 40 is positioned on the upper side (+z side) of the stator 30. In the present embodiment, the bearing holder 40 directly holds the upper-side bearing 24. The shape of the bearing holder 40 in a plan view (xy-plane view) is a circular shape concentric with the center axis J, for example. The bearing holder 40 is made of a metal material. In the present embodiment, the bearing holder 40 is interposed between the motor housing 11 and the substrate housing 12. Note that the shape of the bearing holder 40 in the plan view (xy-plane view) is not limited to a circular shape, and may be another shape such as a polygonal shape.

The bearing holder 40 has the upper surface 40a facing upward. The upper surface 40a faces the lower surface 66a of the first substrate 66. On the upper surface 40a, a pair of housing concavities (concavities) 41 are provided. Each of the housing concavities 41 is recessed downward from the upper surface 40a. In addition, the housing concavity 41 opens upward on the upper surface 40a. The pair of housing concavities 41 are respectively disposed along the peripheral edge portion of the bearing holder 40. The pair of housing concavities 41 are positioned on opposite sides across the center axis J. In the pair of housing concavities 41, the spacers 80 are inserted.

Between the upper surface 40a of the bearing holder 40 and the lower surface 66a of the first substrate 66, the heat dissipation grease G is positioned. The heat dissipation grease G transmits the heat generated in the first substrate 66 and the mounted components mounted on the first substrate 66, to the bearing holder 40. The bearing holder 40 dissipates the heat transmitted from the heat dissipation grease G to the outside. That is, according to the present embodiment, the bearing holder 40 can function as a heat sink. It is preferable that the bearing holder 40 is made of a material having high heat conduction efficiency. It is preferable that the bearing holder 40 is made of an aluminum alloy, for example. The heat dissipation grease G preferably has insulation property. As a result, the heat dissipation grease can suppress discharge between the first substrate 66 and the bearing holder 40. As the material of the bearing holder 40, aluminum, copper, a copper alloy, SUS, or the like may also be used, besides the aluminum alloy.

The bearing holder 40 is provided with a through hole 45 penetrating in the vertical direction. The through hole 45 is positioned substantially at the center of the bearing holder 40. The upper end portion of the shaft 21 is disposed inside the through hole 45. On the inner peripheral surface of the through hole 45, a downward step surface 45a is provided. The through hole 45 accommodates the upper-side bearing 24 in a region below the downward step surface 45a. The upper surface of the outer ring of the upper-side bearing 24 is in contact with the downward step surface 45a via a wave washer 46. Further, the opening on the upper side of the through hole 45 is covered with the lid 70. The lid 70 is fitted and fixed to the through hole 45. The lid 70 can suppress the heat dissipation grease G from entering into the through hole 45.

The first substrate 66 and the second substrate 67 control the motor 1. That is, the motor 1 includes the control device 4 that is configured of the first substrate 66 and the second substrate 67 and controls rotation of the shaft 21. On the first substrate 66 and the second substrate 67, electronic components are mounted. The electronic components mounted on the first substrate 66 and the second substrate 67 include a rotation sensor 61, an electrolytic capacitor, a choke coil, and the like.

The first substrate 66 is disposed on the upper side (+z side) of the bearing holder 40. The second substrate 67 is disposed on the upper side of the first substrate 66. The plate surface directions of both the first substrate 66 and the second substrate 67 are perpendicular to the axial direction. The first substrate 66 and the second substrate 67 are disposed so as to overlap with each other as seen in the axial direction. That is, the first substrate 66 and the second substrate 67 are stacked along the axial direction with a predetermined gap therebetween.

The first substrate 66 has the lower surface 66a and the upper surface 66b. Similarly, the second substrate 67 has the lower surface 67a and the upper surface 67b. The upper surface 66b of the first substrate 66 and the lower surface 67a of the second substrate 67 face each other in the vertical direction with a gap therebetween. The lower surface 66a of the first substrate 66 and the upper surface 40a of the bearing holder 40 face each other in the vertical direction with a gap therebetween. That is, the first substrate 66 is disposed on the upper side of the bearing holder 40 with a gap therebetween. The gap between the lower surface 66a of the first substrate 66 and the upper surface 40a of the bearing holder 40 is filled with the heat dissipation grease G.

On the lower surface 66a of the first substrate 66, the rotation sensor 61 is mounted. Further, the rotation sensor 61 is disposed so as to overlap the sensor magnet 63 of the first substrate 66 when viewed from the axial direction. The rotation sensor 61 detects rotation of the sensor magnet 63. In the present embodiment, the rotation sensor 61 is a magneto-resistive element. The rotation sensor 61 may be another sensor such as a Hall element, for example.

FIG. 4 is an exploded view of the motor 1. In FIG. 4, illustration of the respective mounted components mounted on the substrate housing 12, the first substrate 66, and the second substrate 67 is omitted. As shown in FIG. 4, the first substrate 66 and the second substrate 67 are electrically connected by a plurality of connection pins 51. The first substrate 66 and the second substrate 67 constitute a substrate assembly 68.

As shown in FIG. 1, the first substrate 66 and the second substrate 67 are provided with a plurality of holes 66c and 67c penetrating in the vertical direction respectively. The hole 66c of the first substrate 66 and the hole 67c of the second substrate 67 are disposed so as to overlap each other as seen in the axial direction. The hole 66c of the first substrate 66 and the hole 67c of the second substrate 67 are connected by the connection pin 51.

The control device 4 has the first substrate 66 and the second substrate 67 stacked along the vertical direction (axial direction). In addition, the first substrate 66 is electrically connected to the second substrate (another substrate) disposed on the upper side, by the connection pin 51. According to the control device 4 of the present embodiment, with a plurality of substrates (the first substrate 66 and the second substrate 67) electrically connected to each other, it is possible to select mounted components to be mounted on each substrate according to the thermal characteristics. In the present embodiment, the first substrate is in thermal contact with the bearing holder 40 having a function as a heat sink via the heat dissipation grease G. Therefore, the first substrate 66 has higher heat dissipation efficiency than that of the second substrate 67. In the case of mounting mounted components that are likely to generate heat on the first substrate 66, it is possible to provide the motor 1 having excellent heat dissipation characteristics as a whole. In addition, it is possible to mount mounted components that are likely to generate heat on the second substrate 67, and to mount mounted components that are susceptible to heat on the first substrate 66. In that case, it is possible to make it difficult for the mounted components of the first substrate 66 to be affected by heat.

As shown in FIG. 1, the connection pin 51 extends along the axial direction (vertical direction) between the hole 66c of the first substrate 66 and the hole 67c of the second substrate 67. The connection pin 51 has a first tip portion 51a located on the lower side and a second tip portion 51b located on the upper side. The first tip portion 51a is inserted into the hole 66c of the first substrate 66 from the upper surface 66b side, and is connected to the first substrate 66. The second tip portion 51b is inserted into the hole 67c of the second substrate 67 from the lower surface 67a side, and is connected to the second substrate 67.

The connection between the first tip portion 51a and the hole 66c of the first substrate 66 and the connection between the second tip portion 51b and the hole 67c of the second substrate 67 are so-called press-fit connection. The first tip portion 51a is slightly wider than the hole 66c. The first tip portion 51a is press-fitted into the hole 66c. As a result, a mechanical contact load is generated between the first tip portion 51a and the hole 66c, and the first tip portion 51a and the hole 66c are electrically connected to each other. Similarly, the second tip portion 51b is slightly wider than the hole 67c, and the second tip portion 51b and the hole 67c are electrically connected to each other by a mechanical contact load.

According to the present embodiment, the first substrate and the second substrate 67 are connected by press-fit connection via the connection pins 51. When press-fit connection is adopted, solder is not needed between the connection pin 51 and the first substrate 66 and between the connection pin 51 and the second substrate 67. In addition, since the process of press-fitting the connection pin 51 into the hole 66c (or the hole 67c) can be performed simultaneously for a plurality of the connection pins 51, it can be completed in a short time. Thereby, it is possible to simplify the manufacturing process, to reduce the manufacturing cost, and to provide inexpensive control device 4 and inexpensive motor 1.

As shown in FIG. 4, the connection pins 51 are classified into a first connection pin group (first wiring group) 56A and a second connection pin group (second wiring group) 56B. The first connection pin group 56A and the second connection pin group 56B are positioned at opposite sides in the radial direction across the center axis J. The connection pins 51 of the first connection pin group 56A and the second connection pin group 56B are arranged side by side in a plurality of rows and columns.

The control device 4 of the present embodiment has control circuits of two systems or the like. In the present embodiment, the control device 4 includes two mounted components that perform the same function and two control circuits connecting the mounted components. As a result, the redundancy of the control device 4 is enhanced. That is, even if any trouble occurs in the control circuit of one system, the control device 4 can continue driving of the motor 1 by the control circuit of the other system. The first connection pin group 56A serves as a part of one of the control circuits of the two systems, and the second connection pin group 56B serves as a part of the other control circuit. That is, the first substrate 66 and the second substrate 67 are electrically connected by the connection pins 51 of the two systems. Even if the control circuit or the like of the one system fails, as long as the motor can be driven by the other control circuit, the two control circuits in the control device 4 do not necessarily have the same function. At least a part of the functions thereof may be different. Further, the two control circuits may not necessarily have two mounted components that perform the same function.

The spacer 80 is made of an insulating material. The spacer 80 is interposed between the bearing holder 40 and the first substrate 66. The spacer 80 is inserted into the housing concavity 41. The spacer 80 is fixed to the bearing holder 40 by means of adhesion or the like.

As shown in FIG. 2, the spacer 80 has a bottom wall portion 82, a side wall portion 81, and a flange portion 83. The bottom wall portion 82 and the side wall portion 81 cover the inner surface of the housing concavity 41. In addition, the spacer 80 constitutes a box body opened upward by the bottom wall portion 82 and the side wall portion 81. The bottom wall portion 82 and the side wall portion 81 are covered with the spacer 80. Inside the spacer 80, the first tip portion 51a of the connection pin 51, protruding from the lower surface 66a of the first substrate 66, is accommodated. That is, the first tip portion 51a protruding from the lower surface 66a is accommodated in the housing concavity 41 via the spacer 80.

As shown in FIG. 4, the bearing holder 40 has the pair of housing concavities 41, and the spacers 80 are inserted in the respective housing concavities 41. Further, the first connection pin group 56A is inserted in one of the pair of spacers 80, and the second connection pin group 56B is connected to the other. That is, the first tip portions 51a of the connection pins 51 (the first connection pin group 56A) constituting one system and the first tip portions 51a of the connection pins 51 (the second connection pin group 56B) are disposed so as to be surrounded by side wall portions 81 of different spacers 80, respectively.

As shown in FIG. 2, according to the present embodiment, the first tip portion 51a protruding from the lower surface 66a of the first substrate 66 is accommodated in the housing concavity 41 provided to the upper surface 40a of the bearing holder 40. Therefore, according to the present embodiment, the first tip portion 51a and the bearing holder 40 can be spaced apart from each other in the vertical direction without increasing the distance between the upper surface 40a of the bearing holder 40 and the lower surface 66a of the first substrate 66. As a result, it is possible to reduce the vertical dimension of the control device 4 and the motor 1 having the control device 4.

According to the present embodiment, the inner surface of the housing concavity 41 is covered with the spacer 80 made of an insulating material. In general, insulating materials have better insulation property than that of the air at atmospheric pressure. Therefore, by providing the spacer 80, it is possible to bring the first tip portion 51a and the inner surface of the housing concavity 41 close to each other while securing the insulation property, as compared with the case where the spacer 80 is not provided. It is possible to reduce the dimension of the housing concavity 41 in the vertical direction and the direction orthogonal to the vertical direction, and as a result, it is possible to reduce the dimension of the control device 4 and the motor 1 having the control device 4.

The bottom wall portion 82 has a substantially rectangular shape in a plan view. Further, as shown in FIG. 2, the bottom wall portion 82 is disposed along the bottom surface of the housing concavity 41. A gap is provided between the bottom wall portion 82 and the housing concavity 41. The bottom wall portion 82 is positioned between the first tip portion 51a of the connection pin 51 and the bearing holder 40, along the vertical direction. The bottom wall portion 82 secures insulation property in the vertical direction of the first tip portion 51a and the bearing holder 40. Since the bottom wall portion 82 is provided, the vertical dimension of the control device 4 can be reduced.

The side wall portion 81 extends upward from the peripheral edge of the bottom wall portion 82. The side wall portion 81 is disposed along the inner side surface of the housing concavity 41. The height dimension of the side wall portion 81 is smaller than the depth dimension of the housing concavity 41. The side wall portion 81 collectively encloses the first tip portions 51a of the connection pins 51 in a plan view. The side wall portion 81 ensures insulation property between the first tip portion 51a and the side wall portion of the housing concavity 41. By providing the side wall portion 81, it is possible to reduce the dimension (radial dimension) in the direction orthogonal to the vertical direction of the control device 4.

The flange portion 83 is located at the upper end of the side wall portion 81. The flange portion 83 is interposed between the bearing holder 40 and the first substrate 66. That is, the spacer 80 is in contact with both the facing surfaces (the upper surface 40a and the lower surface 66a) of the bearing holder 40 and the first substrate 66 in the flange portion 83.

The flange portion 83 defines the vertical position of the first substrate 66 with respect to the bearing holder 40. Since the height dimension of the side wall portion 81 is smaller than the depth dimension of the housing concavity 41 as described above, there is a gap between the bottom wall portion 82 and the housing concavity 41. Therefore, by precisely managing the thickness of the flange portion 83, it is possible to precisely position the first substrate 66 without strictly controlling the dimension in the height direction of the side wall portion 81.

The flange portion 83 is disposed so as to surround the first connection pin group 56A (or the second connection pin group 56B). Further, the flange portion 83 is in contact with the mutually facing surfaces of the bearing holder 40 and the first substrate 66. The flange portion 83 receives a force when the connection pin 51 is press-fitted into the hole 66c of the first substrate 66, to thereby be able to reduce the load on the first substrate 66.

Figure 5:
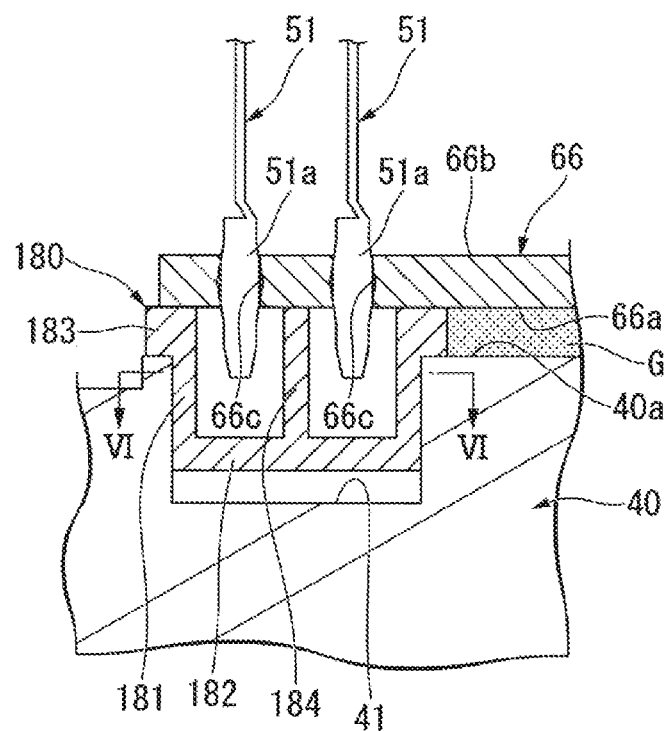
FIG. 5 is a cross-sectional view of a spacer of a modification of an example embodiment of the present disclosure.
Figure 6:
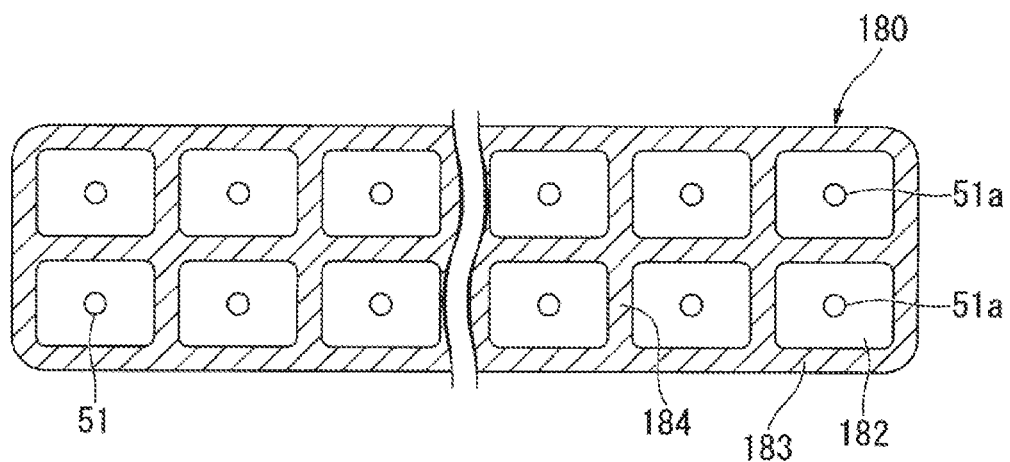
FIG. 6 is a cross-sectional view taken along line VI-VI of FIG. 5.

FIG. 5 is a cross-sectional view of a spacer 180 according to a modification that can be adopted in the above-described embodiment. FIG. 6 is a cross-sectional view taken along line VI-VI in FIG. 5. Note that members or portions that have their equivalents in the above-described embodiment are denoted by the same reference numerals as those of their equivalents in the above-described embodiment, and descriptions of those members or portions are omitted.

The spacer 180 has a bottom wall portion 182, a side wall portion 181, a partition wall portion 184, and a flange portion 183. The bottom wall portion 182 is disposed along the bottom surface of the housing concavity 41. The side wall portion 181 extends upward from the bottom surface of the bottom wall portion 182. The side wall portion 181 is disposed along the inner side surface of the housing concavity 41. The bottom wall portion 182 and the side wall portion 181 constitute a box body which opens upward. The partition wall portion 184 extends upward from the bottom wall portion 182. The partition wall portion 184 has a cross shape in a plan view. The partition wall portion 184 partitions the inside of the side wall portion 181 into a plurality of regions in a plan view. The height of the upper surface of the partition wall portion 184 is equal to the height of the upper surface of the flange portion 183. The flange portion 183 is located at the upper end of the side wall portion 181. The flange portion 183 is interposed between the bearing holder 40 and the first substrate 66.

As shown in FIG. 6, the first tip portion 51a of one connection pin 51 is accommodated in each of the regions defined by the partition wall portion 184 and the side wall portion 181.

According to the present modification, since the first tip portions 51a of the connection pins 51 are disposed in the regions partitioned by the partition wall portions 184, it is possible to ensure the insulation property between the first tip portions 51a. In addition, the partition wall portion 184 functions as a rib for reinforcing the spacer 180. In addition, the partition wall portion 184 receives a force when the connection pin 51 is press-fitted into the hole 66c of the first substrate 66, to thereby be able to reduce the load on the first substrate 66 more effectively.

In the present embodiment, the following configuration may be adopted. In the present embodiment, the case where the first tip portion 51a is connected to the first substrate 66 by press-fitting using the connection pin 51 as the wiring has been exemplified. However, as a wiring, a bending conductive wire may be adopted. In that case, the tip portion (corresponding to the first tip portion 51a) of the wiring can be inserted from the upper surface 66b into the hole 66c of the first substrate 66 and connected by soldering on the lower surface 66a side. Even in that case, the spacer 80 has an effect of ensuring insulation property between the tip portion of the wiring and the bearing holder 40.

In the present embodiment, the case where the first substrate 66 is connected to the second substrate 67 via the connection pin 51 has been exemplified. However, an external device may be connected to the first substrate 66 via wiring (corresponding to the connection pin 51).

In the present embodiment, the case where the spacer 80 has the flange portion 83 having a shape along the opening peripheral edge of the housing concavity 41 has been described. However, as shown in FIG. 4, the flange portion 83 may have an extension portion 85 extending along the circumferential direction of the center axis J. The extension portion 85 is interposed between the bearing holder 40 and the first substrate 66. In the case where the extension portion 85 is provided, the flange portion 83 can define a gap (vertical distance) between the bearing holder 40 and the first substrate 66 in a wide range. The extension portions 85 of the pair of spacers 80, disposed opposite to each other across the center axis J, may be integrally connected along the circumferential direction of the center axis J. Further, the extension portion 85 may have a through hole for inserting a screw, and may be screwed to the bearing holder 40 together with the first substrate 66.

Figure 7:
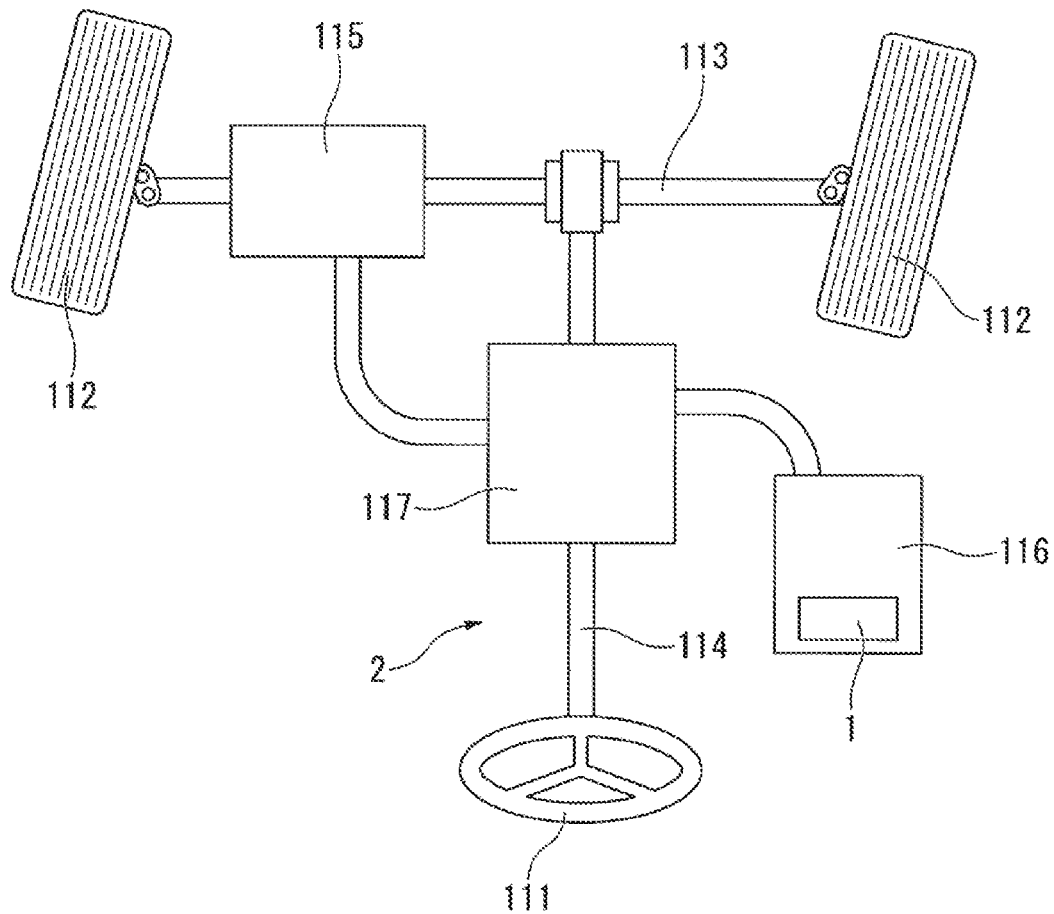
FIG. 7 is a schematic diagram showing an electric power steering apparatus according to an example embodiment of the present disclosure.

Next, an embodiment of an apparatus on which the motor 1 of the present embodiment is mounted will be described. In the present embodiment, an example in which the motor 1 is mounted on an electric power steering apparatus will be described. FIG. 7 is a schematic diagram showing an electric power steering apparatus 2 of the present embodiment.

The electric power steering apparatus 2 is mounted on a wheel steering mechanism of an automobile. The electric power steering apparatus 2 is an apparatus that reduces the steering force by hydraulic pressure. As shown in FIG. 7, the electric power steering apparatus 2 of the present embodiment includes the motor 1, a steering shaft 114, an oil pump 116, and a control valve 117.

The steering shaft 114 transmits the input from a steering wheel 111 to an axle 113 having wheels 112. The oil pump 116 generates a hydraulic pressure in a power cylinder 115 that transmits a hydraulic driving force to the axle 113. The control valve 117 controls the oil of the oil pump 116. In the electric power steering apparatus 2, the motor 1 is mounted as a drive source of the oil pump 116.

Since the electric power steering apparatus 2 of the present embodiment includes the motor 1 of the present embodiment, the electric power steering apparatus 2 that exhibits the same effect as that of the above-described motor 1 is obtained.

Features of the above-described preferred embodiments and the modifications thereof may be combined appropriately as long as no conflict arises.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. A motor control device comprising:
   a frame including a metal material;
   a substrate disposed on an upper side of the frame with a gap between the substrate and the upper side of the frame, the substrate including a hole penetrating an upper surface and a lower surface;
   a wiring that is inserted into the hole from a side of the upper surface of the substrate and includes a tip portion connected to the substrate; and
   an insulating spacer interposed between the frame and the substrate; wherein
   the spacer includes a side wall portion that surrounds the tip portion of the wiring in a plan view.

2. The motor control device according to claim 1, wherein the spacer is in contact with facing surfaces of the frame and the substrate.

3. The motor control device according to claim 1, wherein the spacer includes a bottom wall portion between the tip portion of the wiring and the frame.

4. The motor control device according to claim 1, wherein the substrate is connected to tip portions of a plurality of the wirings;

the spacer includes a partition wall portion that divides an inside of the side wall portion into a plurality of regions in a plan view; and the tip portions are positioned in the plurality of regions defined by the partition wall portion, respectively.

5. The motor control device according to claim 4, wherein the partition wall portion has a cross shape in a plan view.

6. The motor control device according to claim 1, wherein a surface of the frame that faces the substrate includes a concavity; and the spacer is inserted in the concavity.

7. The motor control device according to claim 1, wherein the tip portion of the wiring is wider than the hole of the substrate, and is electrically connected to each other by a mechanical contact load.

8. The motor control device according to claim 1, wherein the substrate is electrically connected to another substrate disposed on an upper side by the wiring.

9. The motor control device according to claim 8, wherein two of the substrates are connected to each other by a plurality of the wirings of two systems; and tip portions of the plurality of the wirings defining one system and tip portions of the plurality of the wirings defining another system are surrounded by side wall portions of different spacers, respectively.

10. A motor comprising the motor control device according to claim 1.

11. The motor according to claim 10, further comprising:

a shaft that rotates; and a bearing that supports one end portion of the shaft; wherein the frame holds the bearing.

12. The motor according to claim 10, wherein the frame defines a heat sink that dissipates heat generated in the substrate to an outside.

13. An electric power steering apparatus comprising the motor according to claim 10.

* * * * *